Patented Jan. 29, 1924.

1,482,358

UNITED STATES PATENT OFFICE.

CARLETON ELLIS, OF MONTCLAIR, NEW JERSEY.

CASTING CONTAINING SYNTHETIC RESIN AND PROCESS OF MAKING SAME.

No Drawing. Application filed September 29, 1922. Serial No. 591,262.

*To all whom it may concern:*

Be it known that I, CARLETON ELLIS, a citizen of the United States, and a resident of Montclair, in the county of Essex and State of New Jersey, have invented certain new and useful Improvements in Casting Containing Synthetic Resin and Processes of Making Same, of which the following is a specification.

This invention relates to cast articles made from synthetic resins or compositions containing synthetic resins and to the process of making same and relates particularly to the reaction products of urea, or its appropriate derivatives, with formaldehyde, or its appropriate derivatives, and especially to dimethylol urea or equivalent material or to reaction products derived by the incorporation of urea and formaldehyde in the proportions to make the mono- or dimethylol urea or mixtures of these compounds.

The object of the invention primarily is to produce by the simple operation of casting, that is pouring or forcing a material in a liquid state into a suitable mold and permitting the liquid material to set and harden either by reducing the temperature below the fusing point or by reaction which takes place by virtue of which higher melting point bodies are obtained and solidification of the entire mass results.

Thus urea and formaldehyde may be caused to react by heating together and especially by treatment with a basic substance such as a small amount of barium hydrate or caustic soda to produce methylol urea or dimethylol urea or mxitures of these compounds depending upon the proportions of the reacting materials. One method which I have found effective and which I have described in a co-pending application involves using ordinary aqueous formaldehyde and urea. The amount of water present causes a considerable degree of shrinkage in the molded articles which takes place after removal from the mold and allowing the material to stand for some time. This drying out and shrinkage is objectionable for some purposes and in the present invention I describe methods of employing paraform and reducing or eliminating the water so that shrinkage is not so noticeable. When casting slabs or blocks of the material which may be seasoned, that is exposed to the air or in an oven for a considerable time to dry out, the degree of shrinkage is very noticeable when using a formaldehyde solution of about 40 per cent strength, that is the commercial formalin. However such slabs may be dried out in this manner and then be machined into pipe stems, cigarette holders, buttons and the like without difficulty. On the other hand cast articles which have to possess a much less degree of shrinkage I find may be advantageously produced from paraform or a mixture of paraform and aqueous formaldehyde solution.

A desirable way of introducing paraform is to add enough basic material to bring about rapid solution in the small amount of water which is present. Urea is very soluble in water while paraform is relatively insoluble. In order to produce a homogeneous product it is desirable to have the paraform in solution. The addition of caustic alkali brings about reaction between the paraform and urea with spontaneous heating and the coarse lumps of paraform gradually disappear on shaking until finally a practically clear solution is obtained. This may be filtered or if the action of the alkali is such as to cause further reaction to an extent that is undesirable the solution may be treated with acetic acid or other acid to just neutralize. The neutral solution can be kept for hours or days without serious change provided enough water is present. On the addition of strong acid such as hydrochloric, sulphuric, phosphoric or oxalic acid, or of milder acid substances such as sodium bisulphate and certain organic acids, a reaction takes place with the evolution of heat and the clear liquid sets to a clear gelatinous mass rapidly turning white until it becomes almost a pure white solid material apparently of homogeneous structure, opaque and resembling ivory or in its whitest form appearing like porcelain. The amount of acid and the character of the acid greatly modify the speed of setting. The amount of water present in the mixture also modifies the rate. Thus it is possible to add the acid catalyst to the mixture and thoroughly incorporate it and still have time sufficient in which to pour the liquid into a mold before it sets. Even when the reaction takes place in a few minutes or seconds there is ordinarily no evolution of gases which cause a spongy product such as is characteristic of many resinifying reactions. The mass quietly sets to a transparent jelly which soon becomes opaque but there is no disturbance of the setting mass by the evolution of gases. A strong clear white product of uniform texture is thus obtained without molding under pressure. The material obtained may be turned or machined in any desired manner. Even when made with paraform some water is present and it is desirable to allow the articles to dry out for a time or season to obtain a product of good hardness and toughness. The drying may take place at room temperature or at elevated temperatures as for example 50 or 60° C. or even higher as the drying progresses.

Mixtures which may be used for casting are the following:

1. 100 grams each of urea, paraform and water are mixed. The paraform does not dissolve. 5 c. c. of aqueous caustic soda solution of about 40 per cent strength are added and on further shaking for a time the paraform goes into solution. Then 10 c. c. of a 10 per cent solution of hydrochloric acid are added to react with the caustic soda so that its action may not be so pronounced. At this point the solution may be filtered to remove any dust or dirt or any hard lumps of paraform which may have escaped solution. 20 c. c. of 10 per cent hydrochloric acid are then added and stirred in thoroughly and the solution poured into a mold. It sets in a few minutes and after an hour or so may be removed from the mold and allowed to dry.

2. 100 grams each of urea and paraform 50 c. c. of water, 5 c. c. of caustic soda solution as aforesaid and 30 c. c. of hydrochloric acid of 10 per cent strength are mixed in a similar manner. The reaction is a very rapid one and molding must be conducted promptly or the mass will set beyond the point where it can be properly cast. A very hard white product is obtained.

3. 118 grams of urea, 100 grams of paraform and 50 c. c. of ordinary formalin solution are mixed and 5 c. c. of the caustic soda solution of 40 per cent strength added. Finally hydrochloric acid is added gradually to acidify and bring about setting of the mass.

4. 100 grams each of urea and paraform, 20 c. c. of water and 5 c. c. of the caustic soda solution were mixed and allowed to react to produce a clear solution, then neutralized with glacial acetic acid to exact neutrality. 10 c. c. of glacial acetic acid were added without causing setting. Finally 20 c. c of 10 per cent hydrochloric acid were added in portions and the mixture heated up indicating reaction was starting. At this point the solution which already had begun to thicken was poured into the mold and it quickly solidified.

Various fillers may be added to the solution before pouring although fillers as a rule impair the glossiness of the surface of the cast article and not infrequently modify the strength usually decreasing it when the filler is in powdered form and acting beneficially when of a fibrous nature. Wood flour is a very desirable filler but has the disadvantage that it colors the mass a yellowish tone. White asbestos may be used, also cotton flock, silk flock etc. When castings of other colors than white are desired the filler may be of a corresponding color or the solution may be dyed. A tiny amount of blue dye improves the whiteness of the castings.

There are the usual mineral fillers whiting, barytes, gypsum, zinc oxide, lithopone, china clay and the like which may be employed. Plaster of Paris acts as a dehydrating agent as well as a filler. Opacity may be rendered more permanent by the addition of a small amount of filling material. Luminous zinc sulphide or radium paint powder may be incorporated. Portland cement and similar hydraulic cements may be added. The white product itself may be applied to concrete or masonry to form a white enamel coating.

When made of good quality raw materials very clear white transparent hard products are obtained which may be used for making lenses or goggles and various other applications where a transparent non-inflammable substance is desired free from the dangerous qualities of nitrocellulose. Other articles which may be made are handles for tools and surgical instruments, knives, unbrella handles, toothbrush handles and the like. It may be used for producing door knobs, bathroom fixtures, etc. For toilet articles such as the backs of hand mirrors and brushes the material also may be cast to suitable shape. When well mixed with filler it may be cast or impressed upon a phonograph mold to produce a phonograph record, the surface of the record only need be of the methylol urea compound. A suitable backing of other composition or of cardboard, etc., may be employed to reduce the cost. Spheres such as billiard balls and the like may be produced from the hardest grades of the material.

A good method or procedure in judging the degree of reaction between urea and the formaldehyde, paraform or other aldehyde employed is to permit the reaction between the two substances, as for example urea and paraform, to progress in the alkaline medium to the point where particles begin to precipitate and at that instant arrest the action by the addition of acetic or other acid to approximate neutrality. If the alkali is allowed to react beyond a certain point the whole mass may solidify to a magma or white pasty substance which cannot be used advantageously for casting although it may be dried out and used in certain hot-pressing operations. Therefore before the liquid starts to thicken with separation of the reaction product the liquid is neutralized. Thereafter the acid catalyst may be added in such proportion, with or without cooling, as may be desired with reference to speed of setting.

Reference is made to my copending application Serial No. 590,672, which is concerned with somewhat similar subject matter especially the production of castings from urea and formaldehyde. In the present application the polymers of formaldehyde, such as paraform, are particularly considered. Attention also is called to Serial No. 568,251 which involves the production of molding compositions from material of the general character of dimethylol urea. Serial No. 587, 580 also includes mention of the use of dimethylol urea as an addition to other plastic products.

What I claim is:—

1. A casting made from the reaction product of urea and paraform.

2. A casting made from the reaction product of urea, paraform and formalin.

3. The process of making a cast article which comprises reacting on urea with paraform in the presence of an aqueous alkaline solution just sufficient in amount to bring about reaction between urea and paraform to form the methylol urea, acidifying with a strong acid and pouring the composition into molds to permit it to set.

4. The process of making castings which comprises reacting on urea with paraform and formalin in the presence of an alkaline catalyst to form a substantially clear solution and in causing further reaction to take place within a mold whereby a cast product is obtained.

5. The process of casting articles of a pure white color which comprises treating urea with paraform in the presence of an alkaline medium to produce a concentrated solution of a reaction product of the urea and paraform, adding a setting catalyst and pouring the liquid into a mold to permit it to harden in a definte shape.

CARLETON ELLIS.